(12) United States Patent
Avni et al.

(10) Patent No.: US 12,561,460 B2
(45) Date of Patent: Feb. 24, 2026

(54) SYSTEM AND METHOD FOR PERFORMING SECURITY ANALYSES OF DIGITAL ASSETS

(71) Applicant: The Toronto-Dominion Bank, Toronto (CA)

(72) Inventors: Michael Avni, Ganot (IL); Puneet Mahajan, Whitby (CA)

(73) Assignee: The Toronto-Dominion Bank, Toronto (CA)

( * ) Notice: Subject to any disclaimer, the term of this patent is extended or adjusted under 35 U.S.C. 154(b) by 309 days.

(21) Appl. No.: 18/173,428

(22) Filed: Feb. 23, 2023

(65) Prior Publication Data

US 2024/0289474 A1 Aug. 29, 2024

(51) Int. Cl.
*G06F 21/62* (2013.01)
*G06F 21/53* (2013.01)

(52) U.S. Cl.
CPC .......... *G06F 21/6209* (2013.01); *G06F 21/53* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,499,353 B2 | 7/2013 | Lockart et al. | |
| 8,522,348 B2 | 8/2013 | Chen et al. | |
| 9,558,677 B2 | 1/2017 | Sadeh-Koniecpol et al. | |
| 9,582,665 B2 | 2/2017 | Eytan et al. | |
| 9,779,252 B2 | 10/2017 | Sharma et al. | |
| 10,911,470 B2 | 2/2021 | Muddu et al. | |
| 11,153,336 B2 | 10/2021 | Beatty et al. | |
| 11,531,748 B2 * | 12/2022 | Zhan .................... | G06F 21/566 |
| 2012/0079596 A1 * | 3/2012 | Thomas ............. | H04L 63/1433 726/24 |
| 2016/0292420 A1 * | 10/2016 | Langton ............... | G06F 21/567 |
| 2016/0335435 A1 * | 11/2016 | Schmidtler ........... | G06N 20/00 |
| 2018/0046799 A1 * | 2/2018 | Kohavi ................... | G06F 21/53 |
| 2020/0134176 A1 * | 4/2020 | Youngberg .......... | G06F 21/562 |
| 2022/0083662 A1 * | 3/2022 | Grobman .............. | G06N 20/00 |
| 2023/0252136 A1 * | 8/2023 | Kim ...................... | G06F 21/566 726/22 |
| 2024/0330454 A1 * | 10/2024 | Burns ................... | G06F 21/563 |

FOREIGN PATENT DOCUMENTS

EP 3598331 A1 1/2020

* cited by examiner

*Primary Examiner* — Christopher C Harris
(74) *Attorney, Agent, or Firm* — CPST Intellectual Property Inc.; Brett J. Slaney; Amy Scouten

(57) ABSTRACT

A system and method are provided for assessing potentially malicious data files. The method includes receiving a data file possessing one or more unknown security characteristics, and providing an interface for enabling automatic selection of at least one of a plurality of analysis tools to determine the one or more unknown security characteristics. The method includes automatically determining the selected at least one of the plurality of analysis tools to be applied to the received data file, and automatically providing the data file to each of the at least one selected analysis tool to have at least one corresponding analysis performed to determine one or more of the unknown security characteristics. The method includes receiving results generated by the at least one selected analysis tool, and aggregating (e.g., using a machine learning model) and outputting the results in a review interface.

20 Claims, 9 Drawing Sheets

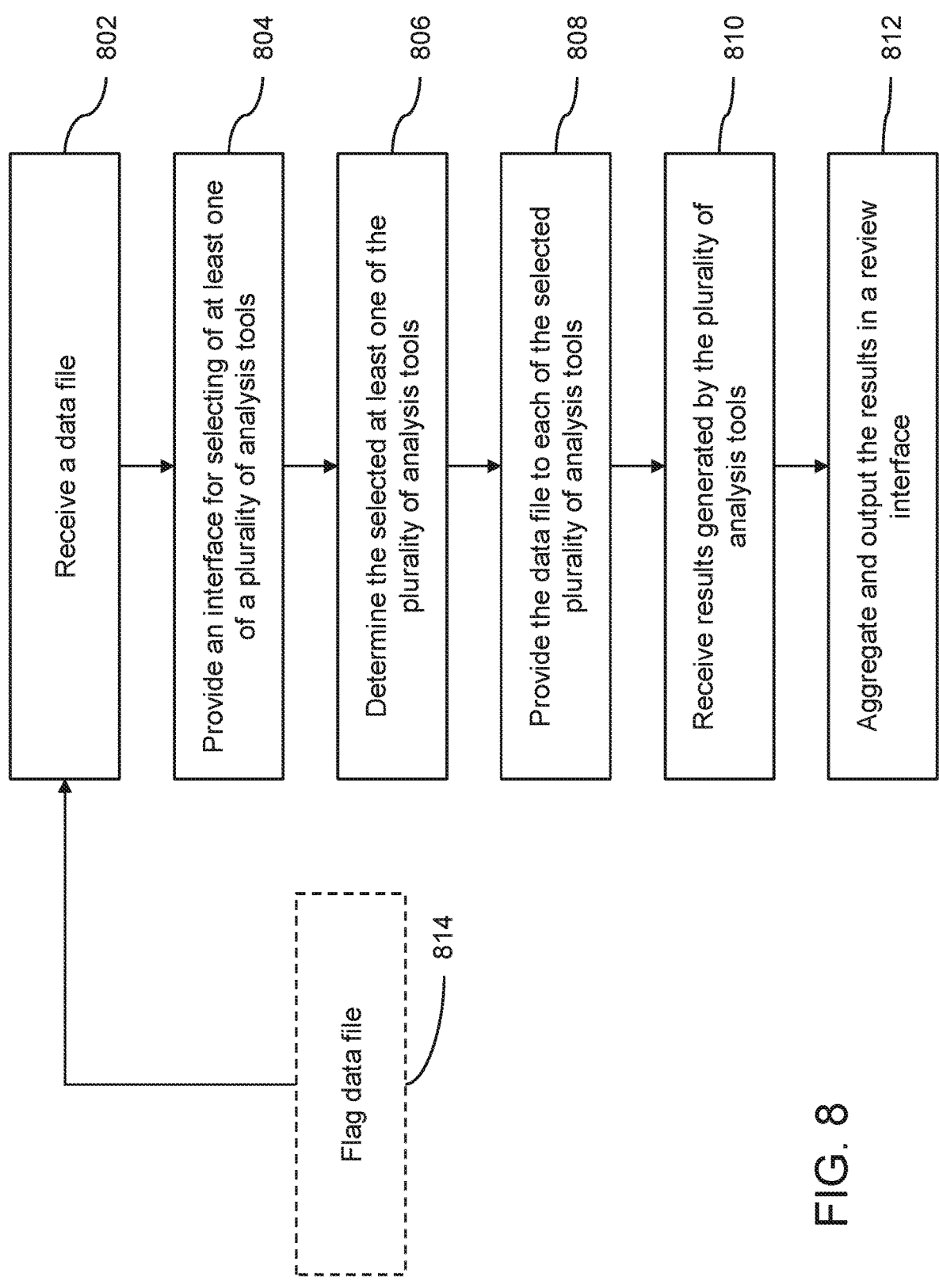

802 Receive a data file

804 Provide an interface for selecting of at least one of a plurality of analysis tools 806 Determine the selected at least one of the plurality of analysis tools 808 Provide the data file to each of the selected plurality of analysis tools 810 Receive results generated by the plurality of analysis tools 812 Aggregate and output the results in a review interface 814 Flag data file

FIG. 8

SYSTEM AND METHOD FOR PERFORMING SECURITY ANALYSES OF DIGITAL ASSETS

TECHNICAL FIELD

The following relates generally to securing digital systems and, in particular, to performing security analyses of digital assets.

BACKGROUND

In the transition to increasingly digital environments, assets deemed worthy of protecting are similarly increasingly digital. For example, a contract, trade secret, etc., once stored in physical location, may increasingly be more likely to be digitized. As a result, adversaries have a greater incentive to, and have acted on the greater incentive to compromise, steal, or otherwise tamper with the digital assets. Adversaries are known to use a variety of different approaches, and attack different parts of digital infrastructures which secure the digital assets.

Maintaining the integrity of digital assets, the systems that store or otherwise interact with the digital assets, and implementing related testing systems, can be a project of such scale so as to be difficult to implement, whether from a budgetary perspective or otherwise.

In addition, assessing the data security systems of various providers which rely on potentially different approaches is similarly becoming difficult to implement.

Reducing the burden of implementing or testing digital security systems, whether that burden is administrative, monetary, resource based (e.g., computing resources), or expertise, etc., is desirable.

BRIEF DESCRIPTION OF THE DRAWINGS

Embodiments will now be described with reference to the appended drawings wherein:

FIG. 8 is a flow diagram of an example of computer executable instructions for processing hierarchical data.

DETAILED DESCRIPTION

Figure 1:
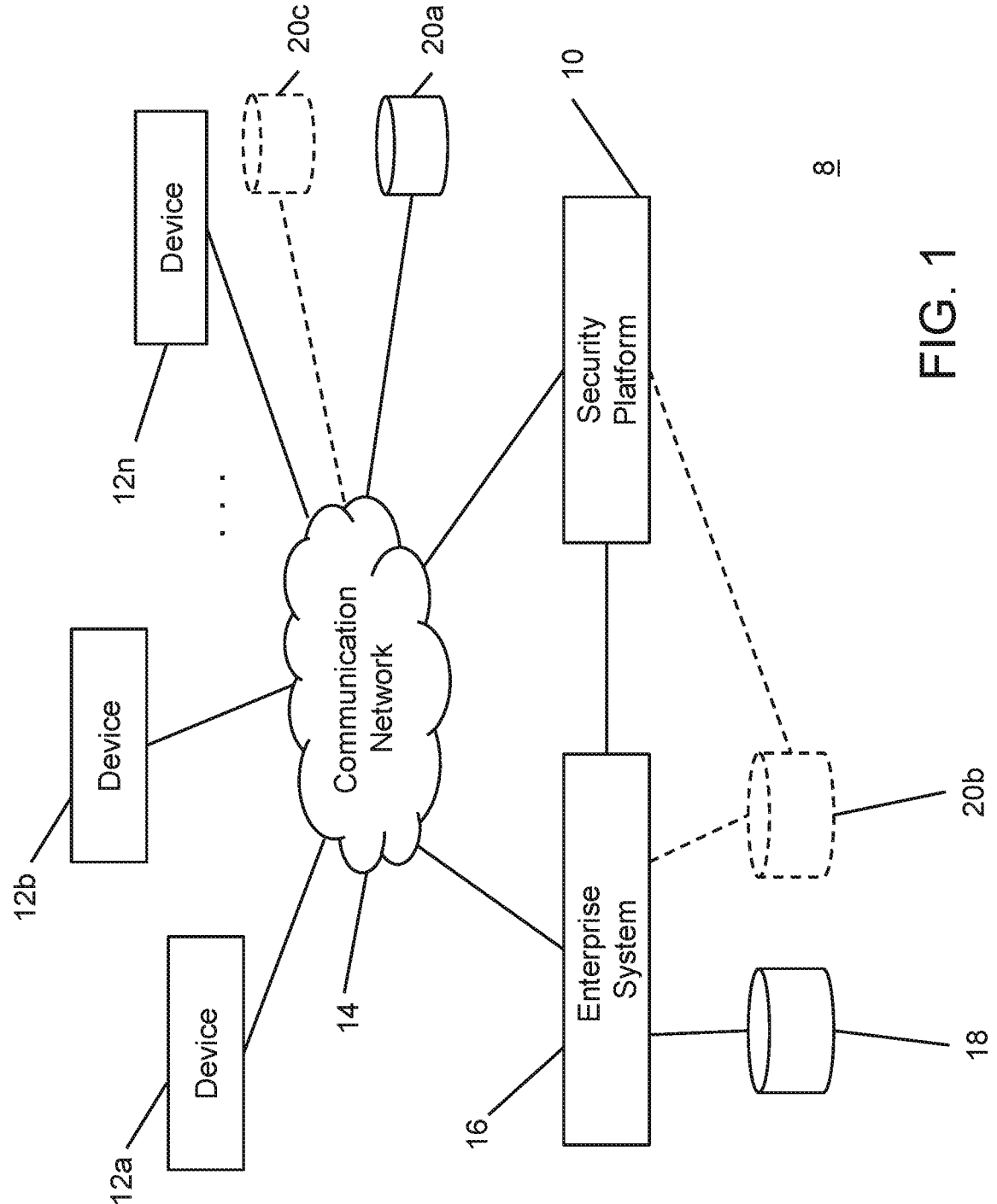
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is understood that the use of the term "data file," also referred to as a "data element" is not intended to be limited solely to individual data files, and that an expansive definition of the term is intended unless specified otherwise. For example, the data file can store information in different formats, can be stored on different media (e.g., a database, a portable data stick, etc.). The data file may not necessarily be an independent file, and can be part of a data file, or include a routine, method, object, etc.

This disclosure relates to a wrapper tool for automating data file security analysis. The wrapper tool can be used to automate relatively small operations, such as automating initiation and use of various analysis tools for a single file, to implementing complex automated security testing. The testing can include testing of different file types, or all files within a designated location, etc.

The disclosed wrapper tool can include the following features: (1) use of a blockchain implemented datastore (referred to as "blockchain" for simplicity) to crowdsource adverse security events, which blockchain can be used to automate security testing with the wrapper tool, (2) preliminary analysis to remove obfuscating material that impedes more computationally expensive testing, and (3) automated updating of other security infrastructure (e.g., a firewall, anti-virus, other custom tool, etc.) by the wrapper tool. In respect of analyst review, the wrapper tool can perform desired analysis (e.g., apply analyst preferred tools) and have the wrapper tool aggregate and present the analysis for consideration. In respect of automated review on a larger scale, the tool enables implementing complex security review processes that can be specified to levels of granularity such as the location of the data file, the type of data file, the available resources, etc. It will be appreciated that while examples provided herein are directed to employees of a commercial enterprise, the principles discussed herein equally apply to other organizations such as government workforces, military organizations, educational institutions, charities, etc.

In one aspect, there is provided a device for conducting data file security analyses. The device includes a processor, a communications module coupled to the processor, and a memory coupled to the processor. The memory stores computer executable instructions that when executed by the processor cause the processor to receive a data file possessing one or more unknown security characteristics. The processor provides an interface, the interface enabling automatic selection of at least one of a plurality of analysis tools for determining the one or more unknown security characteristics. The processor automatically determines the selected at least one of the plurality of analysis tools to be applied to the received data file, and automatically provides the data file to each of the at least one selected analysis tool to have at least one corresponding analysis performed to determine one or more of the unknown security characteristics. The processor receives results generated by the at least one selected analysis tool, and aggregates and outputs the results in a review interface.

In example embodiments, different tools of the plurality of analysis tools are intended to test different security characteristics of the unknown security characteristics.

In example embodiments, the interface is populated with the plurality of analysis tools based on one or more parameters. The parameters can be based on one of: credentials of the requesting party, an availability of each of the plurality of analysis tools, an availability of computing resources, a preference, a predetermined analysis process, a status of the parameters, a location of the data file, a status of prior testing, or a time of the request. The parameters are updated based on one or more management parameters. The management parameters can be based on credentials of the requesting party, an availability of each of the plurality of analysis tools, a status of the rules, a location of the data file, a status of prior testing, or a time of the request.

In example embodiments, to provide the data file to each of the selected plurality of analysis tools, the processor generates a sandbox for testing the data file, generates a dedicated channel for transmitting the data file, and transmits the data file to the sandbox via the dedicated channel.

In example embodiments, the data file is received via a web-based graphical user interface or application programming interface call.

In example embodiments, the interface and the review interface are generated by the same application.

In example embodiments, providing the data file to each of the selected plurality of analysis tools includes loading at least one of the selected plurality of tools locally, to perform analysis on the data file.

In example embodiments, the processor outputs the data file with a label based on whether the results satisfy preliminary release criteria, and outputs the results to a review function to determine if additional action is required. The label can determine access ability of the data file.

In another aspect, a method for assessing potentially malicious data files is disclosed. The method is executed by a device having a communications module and includes receiving a data file possessing one or more unknown security characteristics. The method includes, providing an interface, the interface enabling automatic selection of at least one of a plurality of analysis tools for determining the one or more unknown security characteristics. The method includes automatically determining the selected at least one of the plurality of analysis tools to be applied to the received data file. The method includes automatically providing the data file to each of the at least one selected analysis tool to have at least one corresponding analysis performed to determine one or more of the unknown security characteristics. The method includes receiving results generated by the at least one selected analysis tool, and aggregating and outputting the results in a review interface.

In example embodiments, different tools of the plurality of analysis tools are intended to test different security characteristics of the unknown security characteristics. The interface can be populated with the plurality of analysis tools based on one or more parameters. The parameters can be based on one of: credentials of the requesting party, an availability of each of the plurality of analysis tools, an availability of computing resources, a preference, a predetermined analysis process, a status of the parameters, a location of the data file, a status of prior testing, or a time of the request.

In example embodiments, providing the data file to each of the selected plurality of analysis tools includes generating a sandbox for testing the data file, generating a dedicated channel for transmitting the data file, and transmitting the data file to the sandbox via the dedicated channel.

In example embodiments, providing the data file to each of the selected plurality of analysis tools includes loading at least one of the selected plurality of tools locally, to perform analysis on the data file.

In example embodiments, the method further includes outputting the data file with a label based on whether the results satisfy preliminary release criteria, and outputting the results to a review function to determine if additional action is required.

In another aspect, a non-transitory computer readable medium for assessing potentially malicious data files is disclosed. The computer readable medium includes computer executable instructions for performing the above recited method aspect.

Referring now to the figures, FIG. 1 illustrates an exemplary computing environment 8. The computing environment 8, as shown, includes a security platform 10, one or more client devices 12 (shown by client devices 12a, 12b . . . 12n, hereinafter referred to in the singular for ease of reference), a source of data elements, such as the shown data element storage 20a, and a communications network 14 connecting one or more components of the computing environment 8.

The computing environment 8 can also include an enterprise system 16 (e.g., a financial institution such as commercial bank and/or insurance provider) that provides services to users (e.g., processes financial transactions) which generate, come into possession of, or are responsible for the storage of sensitive data stored in a sensitive datastore 18 (hereinafter referred to simply as a datastore 18, for ease of reference). The enterprise system 16 can include different components, which components have been omitted from FIG. 1 for clarity. Some of the potential components are discussed in FIG. 4, below, with additional detail.

As alluded to above, the datastore 18 includes at least some sensitive data. The sensitive data can include team, intranet, messaging, committee, or other client- or relationship-based data. The sensitive data can be data that is not controlled by certain processes within an enterprise system 16, or otherwise (e.g., enterprise system 16 generated data). For example, the sensitive data can include information about third party application (relative to enterprise system 16) used by employees, such as human resources, information technology (IT), payroll, finance, or other specific application. The sensitive data in the datastore 18 may include data associated with a user of a client device 12 that interacts with the security platform 10, and/or the enterprise system 16 (e.g., an employee, or other user associated with an organization associated with the enterprise system 16, or a customer, etc.). The sensitive data can include customer data associated with a client device 12, and can include, for example, and without limitation, financial data, transactional data, personally identifiable information, data related to personal identification, demographic data (e.g., age, gender, income, location, etc.), preference data input by the client, and inferred data generated through machine learning, modeling, pattern matching, or other automated techniques. In at least one example embodiment, the sensitive data includes any data provided to a financial institution which is intended to be confidential, whether the data is provided by a client, employee, contractor, regulator, etc. The sensitive data in the datastore 18 may include historical interactions and transactions associated with the security platform 10 and/or enterprise system 16, e.g., login history, search history, communication logs, documents, etc.

Figure 3:
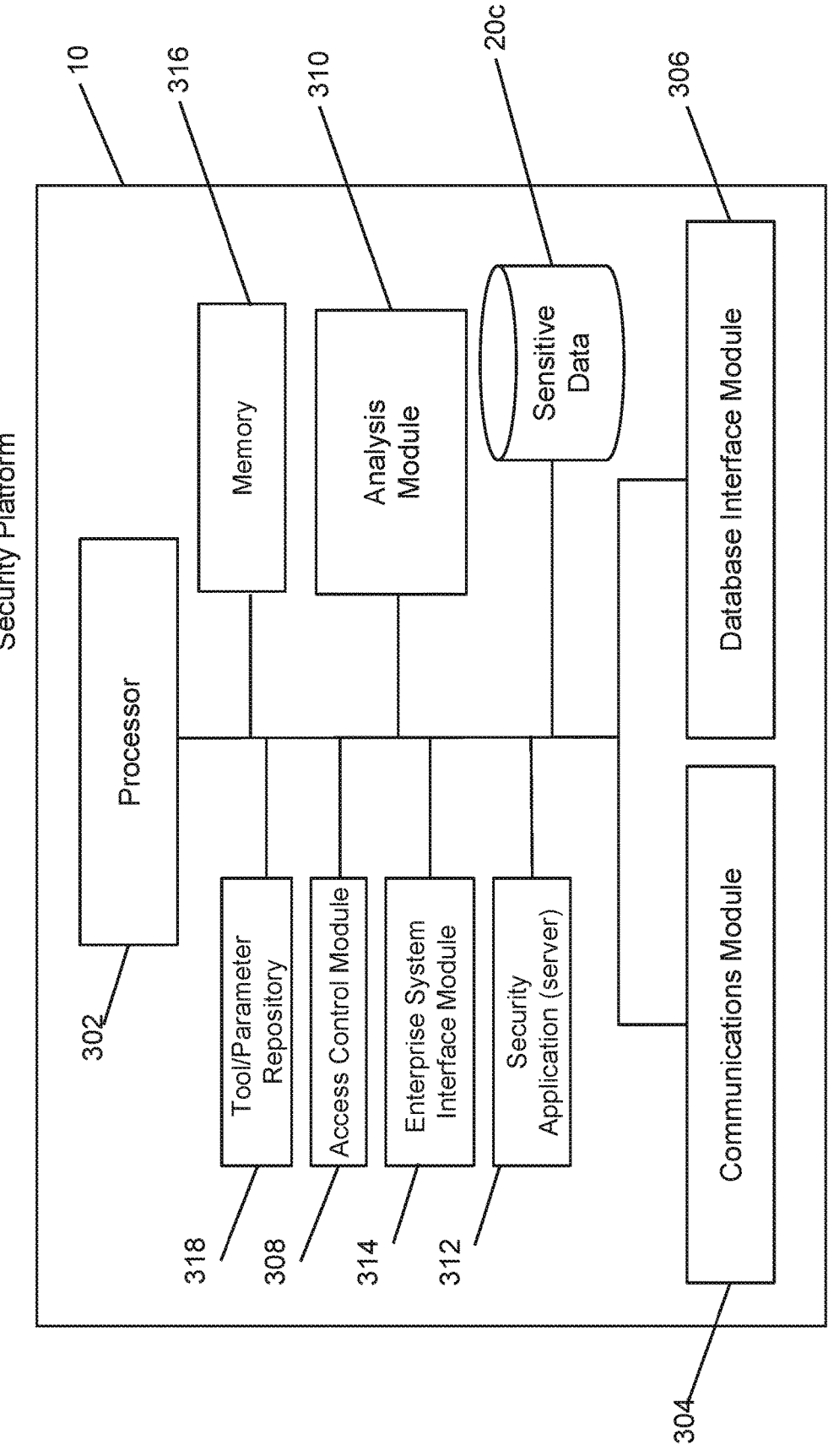
FIG. 3 is a block diagram of an example configuration of a security platform.

The data associated with a user can include data that may be mapped to corresponding data from sources other than the interaction with the enterprise system 16 or the security platform 10 (e.g., see FIG. 3). The sensitive data can, for example, also include any additional data source within the computing environment 8, for example, social media, publicly accessible repositories or other sources for which permission and access to such data is implied or consented to by the user. The datastore 18 can be a datastore that is located outside of an enterprise system 16 responsible for its security, e.g., a datastore 18 within a cloud computing environment, etc.

The security platform 10 is for performing security analyses on digital assets or liabilities (referred to hereinafter more generally as "digital elements") which may be able to, or have the potential to, access the sensitive data within the datastore 18, whether via enterprise system 16 or otherwise. The security platform 10 can have access to various different data or tools. For example, the security platform 10 can have access to a datastore 20a, or 20b, to retrieve parameter(s) used to implement security analysis, or another datastore to retrieve security analysis tools (e.g., datastore 20a), etc., and one or more locations to retrieve digital elements on which security analysis is to be performed. For example, in the shown embodiment, the datastore 20b is a datastore within the enterprise system 16 where files are sent to be designated for automated security analysis. That is, digital elements in the datastore 20b may automatically be subjected to security analysis by the platform 10 as part of an infrastructure to automate security analysis.

The security platform 10 may have access to the data element to be analyzed via the enterprise system 16 (e.g., if the data element is in database 20a), or directly, etc.

In at least some example embodiments, the platform 10 has access to one or more records maintained by a blockchain protocol. In example embodiments, the one or more records are stored in a distributed fashion amongst at least two of the device(s) 12, the system 16 and the platform 10. In another example, the platform 10 accesses the records via the network 14, where the records are illustratively shown as being a datastore 20c. For clarity, it is understood that datastore 20c is a visual placeholder for a distributed network of devices which collectively store data according to a blockchain or similar distributed database protocol.

The datastore 20c can be constantly updated with new incidents, whether by participants of the environment 8, or by other participants. For example, in one contemplated example, the participants in environment 8 are all working on behalf of a bank-owned system 16, and other participants (not shown) from a competitor bank(s) can also add to the datastore 20c. In this way, the datastore 20c can serve as a chronologically accurate, and difficult to compromise set of records outlining malicious activity encountered by the banking industry. In another example, the datastore 20c can be maintained or otherwise configured by proprietors of the platform 10 or analysis tools 211 (as described herein).

The datastore 20c can include a variety of data. For example, the datastore 20c can include a time of a security event, a detection method used to identify the event (e.g., identifying a tool 211 of FIG. 2), parameters used to detect the event (e.g., analogous to parameters 212 of FIG. 2), certain details of the environment in which the event occurred that enable other parties to assess whether they are similarly vulnerable (e.g., a build identifier of the vulnerable software), etc. Different blockchains can be used to store different data. For example, a first blockchain (datastore 20c) can be populated with adverse events related to a first device type (e.g., ATM), while another can be populated with respect to another topic (e.g., a particular application, or build, etc.).

Figure 4:
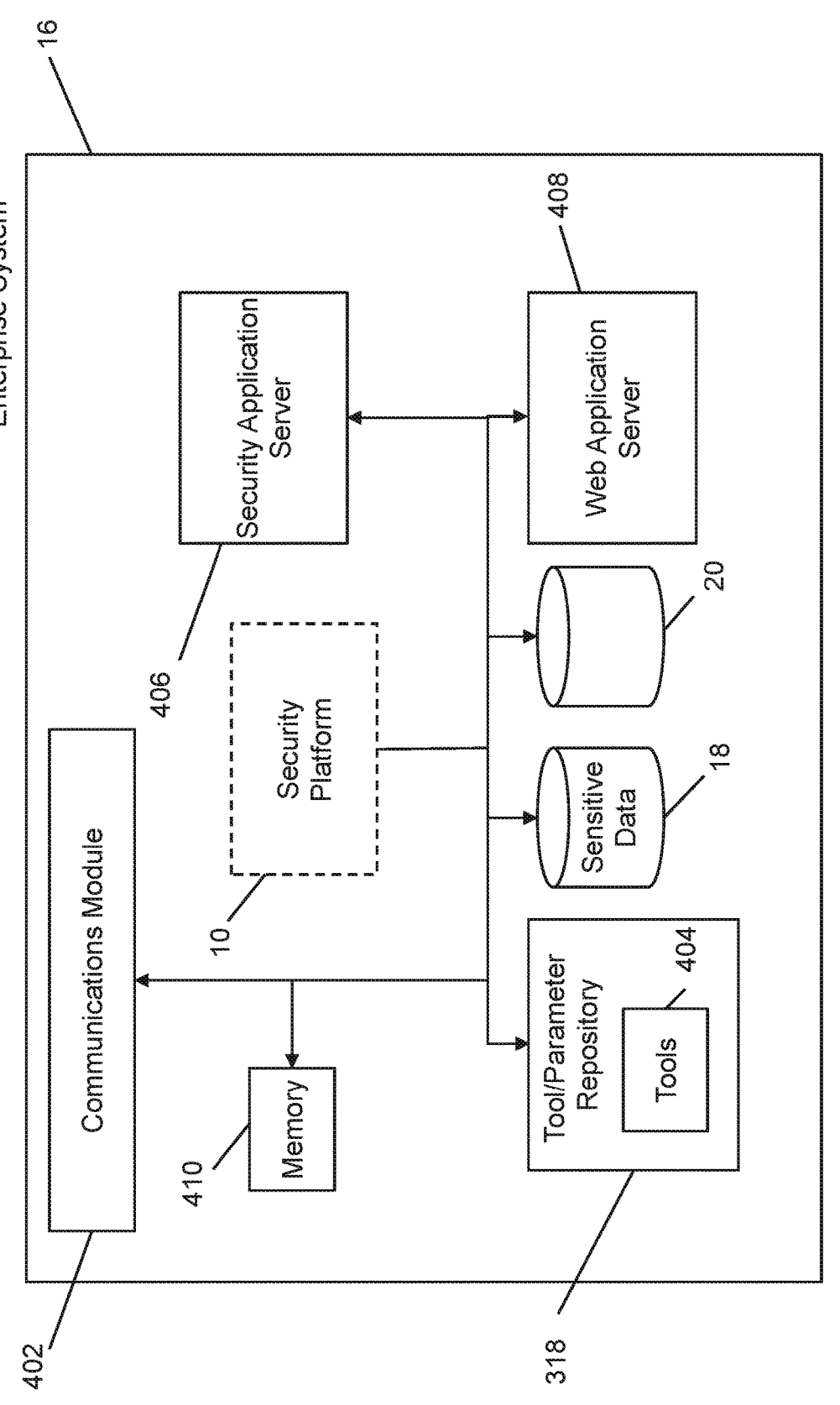
FIG. 4 is a block diagram of an example configuration of an enterprise system.

It can be appreciated that while the security platform 10 and enterprise system 16 are shown as separate entities in FIG. 1, they may also be part of the same system. For example, the security platform 10 can be hosted and provided within the enterprise system 16 as illustrated in FIG. 4.

Client device 12 may be associated with one or more users. Users may be referred to herein as employees, customers, clients, consumers, correspondents, or other entities that interact with the enterprise system 16 and/or security platform 10 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with the security platform 10 as well as mobile or web-based applications provided by the enterprise system 16, which is provided within or is complementary to the security platform 10 to perform security analysis. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12, enterprise system(s) 16, datastore(s) 20, and/or security platform(s) 10. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, security platform 10 may be one or more computer systems configured to process and store information and execute software instructions to perform one or more processes consistent with the disclosed embodiments. In certain embodiments, although not required, security platform 10 may be associated with one or more business entities. In certain embodiments security platform 10 may represent or be part of any type of business entity. For example, the security platform 10 may be a system associated with a commercial bank (e.g., enterprise system 16), a digital media service provider, or some other type of business which performs data analysis (e.g., a cloud computing provider). The security platform 10 can also operate as a standalone entity that is configured to serve multiple business entities, e.g., to act as an agent therefor.

The security platform 10 and/or enterprise system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the security platform 10 and/or enterprise system 16. The cryptographic server may be used to protect, for example, the sensitive database 18 and/or the datafile on which security is being performed, etc., by way of encryption for data protection, digital signatures or message digests for data integrity, and by using digital certificates to authenticate the identity of the users and client devices 12 with which the enterprise system 16 and/or security platform 10 communicates to inhibit data breaches by adversaries. It can be appreciated that various cryptographic mechanisms and protocols can be chosen and implemented to suit the constraints and requirements of the particular deployment of the security platform 10 or enterprise system 16 as is known in the art.

Figure 2:
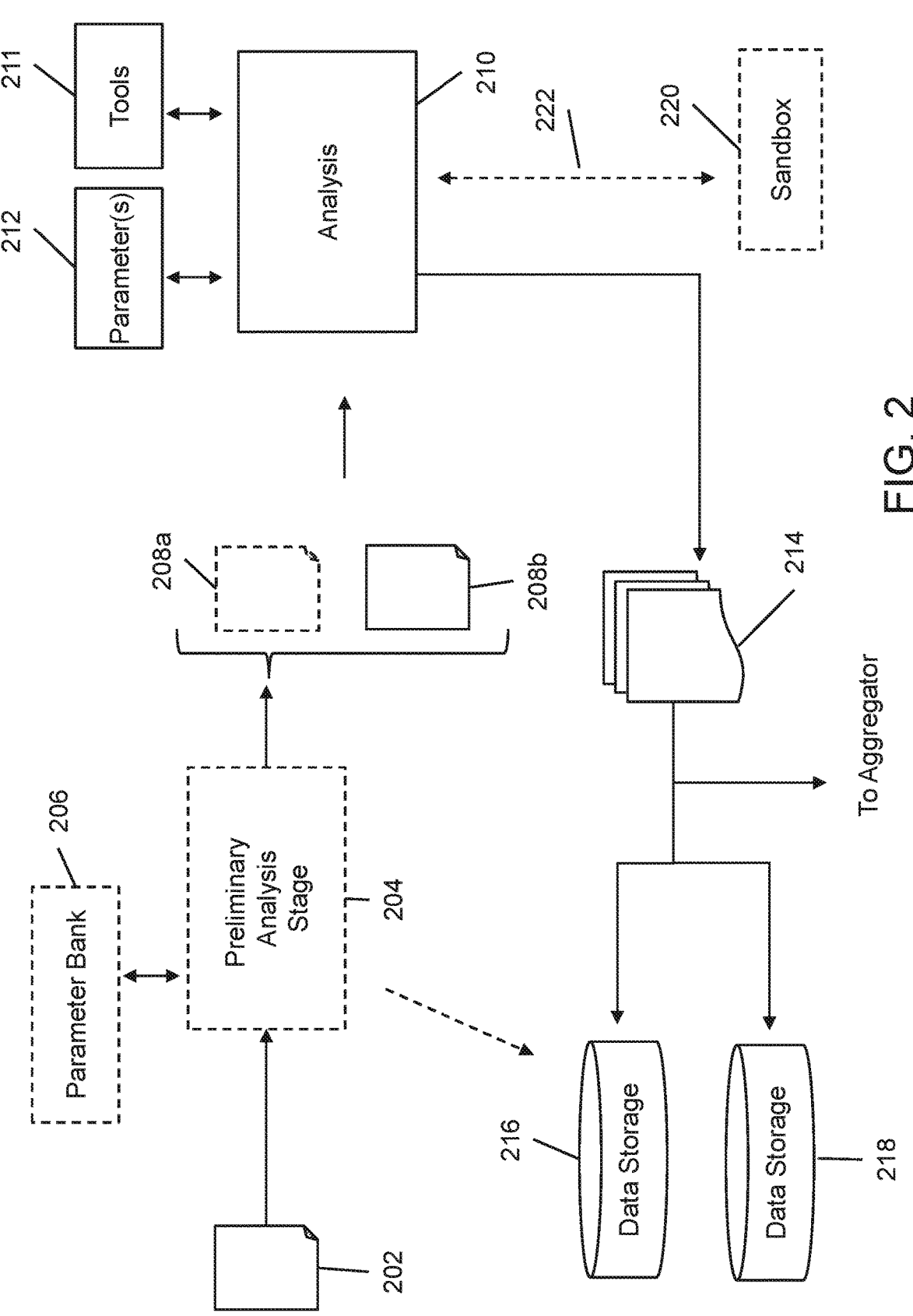
FIG. 2 is a block diagram of an example workflow for implementing security analysis in accordance with the disclosure herein.

FIG. 2 is a block diagram of an example workflow for implementing security analysis in accordance with the present disclosure.

A digital or data element 202 is received for processing. The data element 202 can include a data element, and application, or any digital element capable of interacting with, or compromising systems which store sensitive data, or the sensitive data itself.

The data element 202 includes one or more unknown security characteristics. For example, data element 202 can be an application, and the unknown security characteristic can be how the application interacts with the registry editor. In another example, the data element 202 can be a data element, and the one or more unknown security characteristics can include the presence of malware. Security characteristics can be negative in both an active manner (e.g., the data element 202 includes malware) and a passive manner (e.g., the data element 202 employs sloppy data protection practices). Security characteristics can also be positive or neutral. For example, the security characteristic can include determining that the file is benign, or satisfies certain criteria (e.g., authenticity, security, etc.).

The received data element 202 is provided to an interface (e.g., FIG. 6) in communication with, or related, or part of the security platform 10.

Optionally, the security platform 10 (or an agent thereof) can perform a preliminary analysis at stage 204 on the received data element 202. The preliminary analysis can result in one or more labels (shown in the singular label 208a) being applied to the data element 202. For example, the preliminary analysis stage 204 can include determining whether the data element 202 is a datafile, or an application, etc., and generating a corresponding label 208a which is used for further security analyses. In another example, the preliminary analysis stage 204 can evaluate the source of the data element 202, such as the user requesting the file, the location of the file, any electronic signatures associated with the file, etc., and generate a label 208a which directs the further security analysis (e.g., data element 202 originating in the European Union are analyzed where received, and not moved to North American servers).

The preliminary analysis of stage 204 can be conducted according to one or more parameters of a parameter bank 206. The parameter(s) can be responsive to the credentials of the requesting party (e.g., file generated by executive employees are more thoroughly analyzed, to prevent the disclosure of, or manipulation of confidential information), an availability of each of the plurality of analysis tools (e.g., certain analysis tools can be geo-restricted), a status of the parameters (e.g., in the event that the parameters are being updated, and analysis may be temporarily suspended), a location of the data element (e.g., certain locations/devices may have access to more, or fewer, analysis tools, via, e.g., subscriptions, etc.), a status of prior testing (if any), or a time of the request (e.g., files uploaded outside of working hours may result in the uploaded file being subject to more extensive security testing), etc.

In addition to labelling the data element 202, the preliminary analysis of stage 204 can include processing the data element 202. The processing can include restricting access to computing resources for the data element 202. For example, the data element 202 can be processed into data element 202b that has limited access to the registry, networks, etc.

The processing can include various operations to enable the tools 211 to operate, or to enable an analyst to review the data file 202 independent of the tools. For example, the processing can include applying one or more models to the tools to remove obfuscation. Data file 202 can include an obfuscated JavaScript file, and the stage 204 can apply models (custom, or otherwise) to remove at least some obfuscation. The models can remove certain obfuscating material (e.g., find repeated or extraneous calculations, remove complicated, but useless method groupings, rename variables or other elements with elements to assist review, etc.). In at least some example embodiments, the models can be based on or include machine learning models. For example, a natural language processing machine learning model can be used to categorize code based on a training database of obfuscated software, and flag areas of obfuscation. The machine learning model can similarly be used to determine clusters of methods within the data file 202, including clusters that seemingly have no function other than to sustain the cluster. In some embodiments, the model parses and cleans or removes certain obfuscating elements, and in this way, latency, and the technical difficulty of completing analysis with tools 211 can be alleviated.

The model in stage 204 can perform a preliminary filtering which is less computationally expensive compared to the operations of the tool 211. For example, the cost of the preliminary filtering by the model can reduce either the number of data files 202 provided to the tools 211, or the size of the data file 202 provided to the tools 211. In at least some example embodiments, the preliminary filtering can be used to reduce cloud computing costs, as having the tools 211 operate on the full length of an obfuscated data file 202 can intentionally increase the cost of security, inviting a less expensive security screening.

The models of stage 204 can further be updated at least in part based on data stored in the datastore 20c (i.e., the crowdsources data). For example, a partial retraining of an AI model of stage 204 can automatically be triggered in response to a new detection event, to ensure that the AI model accuracy increases. In example embodiments, the model 204 can be updated to other files automatically, as a result of new events being updated to the datastore 20c.

In the event that a preliminary analysis is performed, the label 208a, the processed (if any) data element 208b, and any other results of the preliminary analysis can be provided to the analysis stage 210.

The analysis stage 210, similar to the preliminary analysis stage 204, applies one or more analysis tools 211 to the received data element 202 (or processed data element 208b) to determine one or more of the unknown security characteristics of the data element. The analysis tools 211 can include standard analysis tools, custom analysis tools, third party analysis tools, such as WildFire™, VirusTotal™, etc., or a combination of different analysis tools.

The analysis tools 211 can test a plurality of different aspects of the data element 202. For example, one analysis tool 211 can test how the data element 202 interacts with available networks, such as network 14, including how the data element 202 sends data, which data it receives, from where, etc. Another analysis tool 211 can test which local resources are impacted by the data element 202. Combinations of the analysis tools 211 can also be performed within the analysis stage 210. For example, two different analysis tools 211 testing different components of the data element 202 can be implemented in stage 210. In example embodiments, different and redundant analysis tools 211 can be applied for added security.

This disclosure contemplates different combinations of analysis tools 211 being utilized to perform their respective analyses in different orders. For example, network analysis tools 211 may be tested in a first sandbox, and afterwards local analysis tools 211 can be tested in a different sandbox, or vice versa.

Testing in stage 210 (or stage 204) can be automated. For example, the parameters 212 (described in more detail herein) can be pre-configured such that the stage 210 performs automated testing in a pre-determined fashion. For example, stage 210 can have one set of parameters 212 that enable automated testing of all application type data elements 202, another set of parameters 212 that test data element type data elements 202, another set of parameters 212 that require vetting of a data element 202 with all available tools 211. In an example embodiment, for example, the parameters 212 facilitate automated testing according to credentials of the user assigned to review the testing.

In example embodiments, the parameters 212 can enable automated testing of analysis tools 211. For example, analysis tools 211 from different providers, or analysis tools 211 being tested more generally, can process the same data element 202 which is preconfigured with known security characteristics. The performance of the analysis stage 210 (or stage 204) can reveal which analysis tool 211 is more successful at determining the known security characteristics, or whether the analysis tools 211 satisfy certain criteria related to the known security characteristics.

To provide an example, in at least one contemplated example embodiment the parameters 212 can be configured to automatically test the accuracy of different tools 211 for detecting malware in the stage 210. The tools 211 can be applied in sequence to the same data element 202 which is pre-arranged with malware (i.e., known security characteristics). Thereafter, the performance of the tools 211 can be automatically compared. The automated comparison can include different aspects of malware related security. For example, tools 211 can be compared based on an ability to detect malware, an ability to implement the desired corrective action (e.g., quarantine vs remove, or automated quarantine as instructed, etc.), ease of integration with a desired notification system, etc. In example embodiments, the parameters 212 can provide for comprehensive testing of the different tools 211. Again referring to the malware example, the parameters 212 can specify testing the tools 211 with different data elements 202, each data element 202 being pre-arranged to have a different type of malware.

The automated testing of the tools 211 can also test different aspects related to the parameters 212. For example, the automated testing may require testing in different locations, with different available resources, within different computing environments (e.g., can the tool 211 perform in different enterprise system 16 silos, which may have unique compatibility issues, etc.).

The one or more parameters 212 (hereafter referred to as parameters 212, for ease of reference) can specify which analysis tools 211 are implemented, and how they are implemented in the stage 210. The parameters 212 can, for example, indicate whether certain tools 211 are available to the stage 210. Similarly, the parameters of the parameter bank 206 can specify which analysis tools 211 are implemented, and how they are implemented in the stage 204. In example embodiments, the parameters 212 and the parameters in the bank 206 are part of the same parameter storage regime.

The parameters 212 can control the tools 211 based on for differently credentialed parties. For example, a senior security analyst may have access to a tool 211 that is not available to a junior analyst owing to cost. Similarly, the parameters 212 can specify that the senior security analyst can override the tool 211 in certain circumstances (e.g., a false positive). In example embodiments, the parameters 212 include preferences for analysis based on the credentialed user requesting the analysis. For example, one analyst may prefer a tool 211 in favor of another similar tool 211. The analyst may prefer a sequence of testing with the tools 211, to ensure that certain testing is completed first. For example, an analyst that deals predominantly with cloud computing related incidents may prefer a tool 211 that is more responsive to cloud security incidents first, prior to completing other testing.

The parameters 212 can control aspects of record keeping related to the use of tools 211. For example, the parameters 212 can specify which metadata is stored, how often it is backed up, etc.

The parameters 212 can also control the use of tools 211 based on an availability of each of the plurality of analysis tools 211. For example, different tools may be approved for use in different silos within an enterprise system 16 (e.g., only custom solutions are used for extremely sensitive material, whereas open source tools may be used for less sensitive material). In another example, tools 211 may not be approved in every jurisdiction, or for every project, in which the platform 10 or enterprise system 16 operates (e.g., certain contracts may require the platform 10 to only use an approved list of tools 211, or the jurisdiction may have laws requiring the use of certain tools to meet regulatory requirements, etc.).

The parameters 212 can control the tools 211 based on a status of the parameters 212. For example, no tools 211 may be available while the parameters 212 are being updated.

The parameters 212 can control the tools 211 based on a location of the data element 202 (e.g., certain tools may be geo-locked). For example, the parameters 212 can control where the tools 211 are instantiated and implemented. Continuing the example, the parameters 212 can specify that the tools 211 are implemented on a North American server, within a particular sandbox (e.g., a location specific sandbox), etc.

The parameters 212 can control the tools 211 based on a status of prior testing. For example, the parameters 212 can require certain tools 211 to be omitted where records of a prior analysis exist, or require different redundant tools 211 to be used as a result of a prior acceptable result by another similar tool 211, to increase certainty. In example embodiments, the parameters 212 may require a different user to take ownership of the analysis of the data element 202 in response to finding records of prior data elements, to force a fresh perspective for review. Alternatively, the parameters 212 may specify files of a certain type be provided to the same reviewing user, to take advantage of that users' expertise.

The parameters 212 can control the tools 211 based on a time of the request. Different computing resources may be available to perform the testing, which resources may only be available at certain times (e.g., server core is shut down for maintenance), etc.

The parameters 212 can determine whether a dedicated channel (e.g., channel 222) for transmitting the data element 202 is required, and the characteristics of that channel.

In addition, the parameters 212 can specify conditions associated with the testing of the data element 202. For example, parameters 212 can indicate whether a test is to be performed in a sandbox 220, where the sandbox 220 is hosted, the access the sandbox 220 has to resources (e.g., resources of the platform 10, or the enterprise system 16, etc.).

As alluded to above, the parameters 212 can control the tools 211 based on one or more pre-determined criteria, which can enable automated testing of data elements 202. For example, the parameters 212 can require performing certain administrator required tools 211 automatically, e.g., for a particular file type, jurisdiction, etc. In another example, the pre-determined criteria can include cost considerations, where the cheapest selection of tools 211 is selected. In another example, the pre-determined criteria can be sensitive to load managing testing on the available computing resources of the platform 10 or system 16. In another example, the pre-determined criteria can be sensitive to testing speed, and configure a sequence of tests with tools 211 that yields a desirable priority of results for certain tests deemed to be needed fastest. In yet another example, the pre-determined criteria can specify a sequence of testing with tools 211 that is based on a most likely contagion chart. Continuing the example, testing tools 211 for recently observed adversarial attacks may be applied first, followed by implementing tools 211 related to less recently observed adversarial attacks, etc.

At least some of the parameters 212 relate to the performance or realization of the parameters 212 themselves (also referred to as parameter management rules). For example, a parameter 212 can specify individuals capable of updating the parameters 212. Similar to the availability of tools 211, the parameters 212 related to the performance or realization of the parameters 212 themselves can be based on the credentials of the requesting party, an availability of the rule in question (e.g., it is being used in deployment), a status of the rules (e.g., being updated by another user), a location of the request (e.g., for security purposes, only certain machines may be able to update the rules 212), or a time of the request, etc.

The output of the stage 210 can include a processed data element 202, analysis results, labels to apply to the data element 202, and parameters related to the testing, all shown as output 214. The processed data element 202 can be the same element 202 that was provided to the stage 210. The analysis results can include raw data, any generated reports, etc.

The stages 210 and 204, described herein, can be implemented in accordance with the parameters as a separate testing tool. For example, the testing tool can integrate with, or interact with the different tools 211, sandbox(es) 220, channel(s) 222, datastores, and aggregators, etc., in order to implement at least in part automated testing. In example embodiments, the testing tool receives a data file possessing one or more unknown security characteristics. The testing tool is for interacting with a plurality of analysis tools, and configured with one or more interface parameters (e.g., API configurations) for each of the plurality of tools for providing data files and initiating analysis. The testing tool provides an interface enabling selection of at least one of the plurality of analysis tools to determine the one or more unknown security characteristics. The testing tool determines a selected at least one of the plurality of analysis tools to be applied to the received data file, and provides, via the tool, the data file to each of the selected plurality of analysis tools to have corresponding analyses performed to determine one or more of the unknown security characteristics. The tool receives, from results generated by the plurality of analysis tools, and aggregates and outputs the results in a review interface.

The label can be one of a plurality of labels defined by the parameters 212. In example embodiments, a machine learning model (not shown) aggregates the results of the analysis, and applies a pre-determined label. In example embodiments, the results are compared with one or more threshold to apply the label. A plurality of different categorization schemes is contemplated.

The labels can indicate at least one of: where the data element 202 is stored, or the nature of any computing resources which the data element 202 can access, etc. For example, the rules 212 can specify at least the following labels: benign (e.g., no restrictions), malware (fully restricted from accessing any computing resources), further testing required (e.g., able to access non-critical infrastructure), isolate from networks (e.g., unable to access the connection network 14), etc.

The outputs 214 can be transmitted or otherwise provided to another location. For example, as shown in FIG. 2, the output 214 can be provided to a database 216, or database 218, for displaying. In another example, parts of the output 214 are stored in different databases. For example, the metadata associated with testing may be stored separately from the processed data element 202.

In at least some example embodiments, the parameters 212, or parameters of the bank 206, are based on data stored in a blockchain based datastore, such as illustrative datastore 20c. In this way, the blockchain records of datastore 20c can be used to "crowdsource" knowledge of malicious events that occur within environments similar to environment 8. For example, one parameter 212 which defines an order of implementing tools 211 can be periodically updated to first implement tools 211 that were recently found to be responsible for detecting events in the datastore 20c. In another example, the blockchain datastore 20c can indicate an increase in attacks in a particular region, triggering increased automated testing by the tool in that region. In yet another example, another parameter of bank 206 can be used to initiate automated testing in response to determining that an event identified in the datastore 20c is sufficiently analogous to circumstances existing in the environment 8. For example, the aforementioned parameter can initiate testing of a particular application in response to the datastore 20c indicating an event relating to the application.

In addition to enabling crowdsourcing of potentially relevant events, basing parameters on the blockchain datastore 20c may potentially advantageously enable asynchronous updating and modular implementation. For example, the parameters (e.g., parameters 212) associated with the blockchain datastore 20c can be maintained by a first team, having access to a first set of computing resources that are connected to the network 14. These computing resources can be selected for their responsiveness and consistency in connecting to the blockchain datastore 20c. In contrast, another set of computing resources, which for security purposes can be isolated from the computing resources used to interact with the blockchain datastore 20c, used by the tool (e.g., stages 206 and 210) to automate actions can be maintained by a separate team and selected for their stability, responsiveness to local regulatory environments, and ability to implement tools 211. From an access management perspective, the modularity can ensure that the resources which interact with the blockchain datastore 20c never gain access to sensitive data maintained by the system 16 or platform 10. That is, the blockchain datastore 20c may only be able to interact with parameters without an ability to access the underlying information. One or more third party tools can be employed to wash or sanitize the sensitive data from messages sent to the resources which manage or contribute to the blockchain records.

In example embodiments where the blockchain datastore 20c is used to aid testing of tools 211, the blockchain datastore 20c can be configured to be responsive to different regulatory requirements on different units of the system 16. For example, a U.S. unit can operate with a first set of limitations, whereas a European unit can operate with different regulatory limitations. The blockchain datastore 20c can be configured to only accept messages which are compliant with local limitations. Continuing the example, the blockchain protocol of datastore 20c can be configured to accept a first type of message from the U.S. unit, a second type of message from the European unit, etc. Alternatively, a subroutine can be used to parse and processes initial messages from each unit into acceptable messages. Each unit can be responsible for, and can broadcast, metadata messages to other units, indicating which types of messages are allowable. As a result, a record of the enterprise 16 taking steps to comply with regulatory requirements is created, and implemented with reduced administrative resources.

In addition, the modularity gained by the blockchain datastore 20c addresses the technical problem of resource access, and simplifies implementation of metadata analysis tools. Minimal integration is required to use data analysis tools on the blockchain datastore 20c as it can be configured to receive no sensitive data. As a result, the data analysis tools used on the blockchain datastore 20c can be quicker, adjusted faster (i.e., without the need to consider integration), etc. This responsiveness can enable more rapid system updates, e.g., via the management parameters.

The platform 10 can be configured to take one or more corrective actions in response to the output 214. For example, the corrective actions can include quarantining the data file, deleting the data file, restricting access to the enterprise system 16, etc. In example embodiments, the corrective actions are triggered by the preliminary analysis in stage 204, and the file is immediately quarantined (shown as optional in FIG. 2). This can happen, for example, in instances where a known malicious file is detected within stage 204, or in instances where extraneous material of a data file 202 is removed, as discussed herein.

The disclosed tool can also address technical difficulties associated with maintaining updated security architecture by performing an updating corrective action, where applications or tools 211 other than the tools 211 which detected an adverse event are updated. For example, a corrective action of the tool can include updating a custom firewall of the system 16 (or sending a message to cause the update), to avoid files similar to files determined to be malware by the tool. In addition, or in the alternative, the corrective action can include broadcasting the detected event to services (e.g., different instances of the same service running at different endpoints in the system 16, or different services, etc.) which are configured to listen and adjust security protocols accordingly. For example, a first unit (e.g., US) may detect an adverse event, and broadcast, within enterprise system 16, the occurrence of the event to update similar security systems in a second unit (Europe).

In FIG. 3, an example configuration of the security platform 10 is shown. In certain embodiments, the security platform 10 may include one or more processors 302, a communications module 304, and a database interface module 306 for interfacing with the datastores of the enterprise client datastore 18 and/or the other datastores 20 (e.g., the shown datastore 20c, within the platform 10) to retrieve, modify, analyze, label, and store (e.g., add) data. Communications module 304 enables the security platform 10 to communicate with one or more other components of the computing environment 8, such as client device 12 (or one of its components), via a bus or other communication network, such as the communication network 14. The security platform 10 includes at least one memory 316 or memory device that can include a tangible and non-transitory computer-readable medium having stored therein computer programs, sets of instructions, code, or data to be executed by processor 302. FIG. 3 illustrates examples of modules, tools and engines stored in memory on the security platform 10 and operated by the processor 302. It can be appreciated that any of the modules, tools, and engines shown in FIG. 3 may also be hosted externally and be available to the security platform 10, e.g., via the communications module 304. In the example embodiment shown in FIG. 3, the security platform 10 includes an access control module 308, the data analysis module 310, the security (server) application 312, and an enterprise system interface module 314.

The security platform 10 can also include a tool and parameter repository 318. The repository 318 can include the tools 211, the parameters 212, the parameters for the parameter bank 206, custom tools 211, such as a machine learning module and recommendation engine to enable the security platform 10 to analyze data elements, to generate isolated computer resources (e.g., sandboxes), to determine whether a data element, or application, or other computer asset is safe, whether one or more labels should apply, or to determine whether the security testing platform is sufficient, etc. Such a recommendation engine may utilize or otherwise interface with a machine learning engine to both classify data currently being analyzed to generate a suggestion or recommendation, and to train classifiers using data that is continually being processed and accessed by the security platform 10. This can result in a tool 211 used by the security platform 10 to perform such operations.

The access control module 308 may be used to apply a hierarchy of permission levels or otherwise apply predetermined criteria to determine what enterprise datastore 18, other data 20, can be shared with which entity in the computing environment 8, and to determine which computing resources can be accessed by any generated sandboxes. For example, the security platform 10 may have been granted access to certain sensitive enterprise datastore 18 to determine the security implications of a new file. In another example, the security platform 10 can have been granted access to only certain servers or computing resource blocks of the enterprise system 10 to generate the sandboxes (e.g., all testing is done on servers that are not connected to sensitive data). Similarly, certain data stored in the enterprise datastore 18, other datastore 20, or otherwise may include potentially sensitive information such as age, date of birth, or nationality, which may not necessarily be needed by the security platform 10 to execute certain actions. As such, the access control module 308 can be used to control the sharing of certain data of the enterprise system 16 or other datastore based on a type of client/user, a permission or preference, or any other restriction imposed by the computing environment 8 or application in which the security platform 10 is used.

The security platform 10 may also include or host the server-side security application 312 that enables client devices 12 to access or control the tools 211, the parameters 212, and to visualize the combined security data. In example embodiments, the application 312 includes an application programming interface (API) to enable functionality of the platform 10 to be accessed via widely available software platforms, such as web browsers. The security connectivity application 312 may also interface with or be integrated into the enterprise system interface module 314 to permit a seamless integration with existing user interfaces and tools associated with the enterprise system 16.

Figure 5:
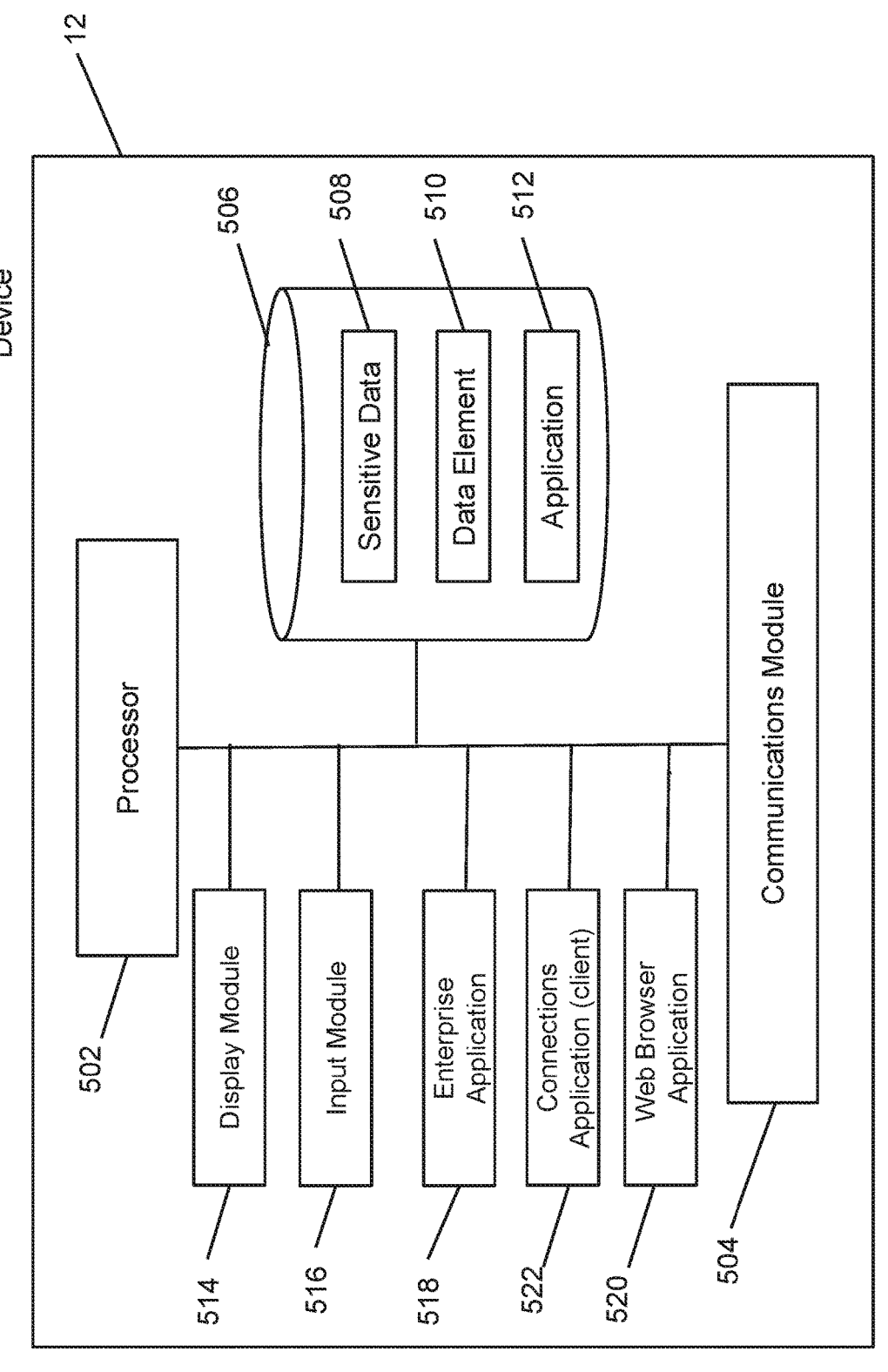
FIG. 5 is a block diagram of an example configuration of a computing device associated with a user, customer, or client.

The enterprise system interface module 314 can provide a GUI or API connectivity to communicate with the enterprise system 16 to obtain enterprise data 18, other datastore 20 (if applicable), for a certain user (see FIG. 5). It can be appreciated that the enterprise system interface module 314 may also provide a web browser-based interface, an application or "app" interface, a machine language interface, etc.

In FIG. 4, an example configuration of the enterprise system 16 is shown. The enterprise system 16 includes a communications module 402 that enables the enterprise system 16 to communicate with one or more other components of the computing environment 8, such as client device 12 (or one of its components) or security platform 10, via a bus or other communication network, such as the communication network 14. The enterprise system 16 includes at least one memory 410 or memory device that can include a tangible and non-transitory computer-readable medium having stored therein computer programs, sets of instructions, code, or data to be executed by one or more processors (not shown for clarity of illustration). FIG. 4 illustrates examples of servers and datastores/databases operable within the system 16. It can be appreciated that any of the components shown in FIG. 4 may also be hosted externally and be available to the system 16, e.g., via the communications module 402.

In the example embodiment shown in FIG. 4, the enterprise system 16 includes one or more servers to provide access to the datastore 18, the tool/parameter repository 318, which can include the one or more analysis tools 404 and, if applicable, at least one source of "other" data from datastore 20 to the security platform 10. One or more servers enable the security platform 10 to interface with existing components, services, departments, and lines of business implemented by the enterprise system 16. Exemplary servers utilized by the enterprise system 16 include a security application server 406, and a web application server 408.

Although not shown in FIG. 4, as noted above, the enterprise system 16 may also include a cryptographic server for performing cryptographic operations and providing cryptographic services. The cryptographic server can also be configured to communicate and operate with a cryptographic infrastructure. The enterprise system 16 may also include one or more data storages for storing and providing data for use in such services, such as data storage 18 for storing sensitive.

Security application server 406 supports interactions with the platform 10 directly when a corresponding security application is installed on the client device 12 within an enterprise system 16. Security application server 406 can access other resources of the enterprise system 16 to carry out requests made by the corresponding security application, and to provide content and data to, the corresponding security application on client device 12. In certain example embodiments, security application server 406 supports an employee mobile desktop, etc.

Web application server 408 supports interactions using a website accessed by a web browser application 520 (see FIG. 5) running on the client device 12. It can be appreciated that the security application server 406 and the web application server 408 can provide different front endpoints for the same application, that is, the mobile (app) and web (browser) versions of the same application of the platform 10. For example, the enterprise system 16 may provide a security application for access by different employees (or related contractors) that may be accessed via a client device 12 via a dedicated application, while also being accessible via a browser on any browser-enabled device.

In FIG. 5, an example configuration of the client device 12 is shown. In certain embodiments, the client device 12 may include one or more processors 502, a communications module 504, and a datastore(s) 506, storing one or more of sensitive data 508, or data elements 510 or applications 512 that are to be the subject of security testing. Communications module 504 enables the client device 12 to communicate with one or more other components of the computing environment 8, such as the security platform 10 or enterprise system 16, via a bus or other communication network, such as the communication network 14. While not delineated in FIG. 5, the client device 12 includes at least one memory or memory device that can include a tangible and non-transitory computer-readable medium having stored therein computer programs, sets of instructions, code, or data to be executed by processor 502. FIG. 5 illustrates examples of modules and applications stored in memory on the client device 12 and operated by the processor 502. It can be appreciated that any of the modules and applications shown in FIG. 5 may also be hosted externally and be available to the client device 12, e.g., via the communications module 504.

In the example embodiment shown in FIG. 5, the client device 12 includes a display module 514 for rendering GUIs and other visual outputs on a display device such as a display screen, and an input module 516 for processing user or other inputs received at the client device 12, e.g., via a touchscreen, input button, transceiver, microphone, keyboard, etc. The client device 12 may also include an enterprise application 518 provided by the enterprise system 16, e.g., for performing mobile insurance, banking, or other financial product or services. The client device 12 in this example embodiment also includes a web browser application 520 for accessing Internet-based content, e.g., via a mobile or traditional website. In this example, the client device 12 also includes a connections application 522, which corresponds to a client-based application to access and interface with the security application 312 hosted by the security platform 10.

The datastore 506 may be used to store device data, such as, but not limited to, an IP address or a MAC address that uniquely identifies client device 12 within environment 8. The datastore 506 may also be used to store application data, such as, but not limited to, login credentials, user preferences, cryptographic data (e.g., cryptographic keys), etc.

It will be appreciated that only certain modules, applications, tools and engines are shown in FIGS. 3 to 5 for ease of illustration and various other components would be provided and utilized by the security platform 10, enterprise system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in security platform 10 or enterprise system 16, or client device 12, or accessible or connectable thereto. Any application or module herein described may be implemented using computer readable/executable instructions that may be stored or otherwise held by such computer readable media.

Figure 6A:
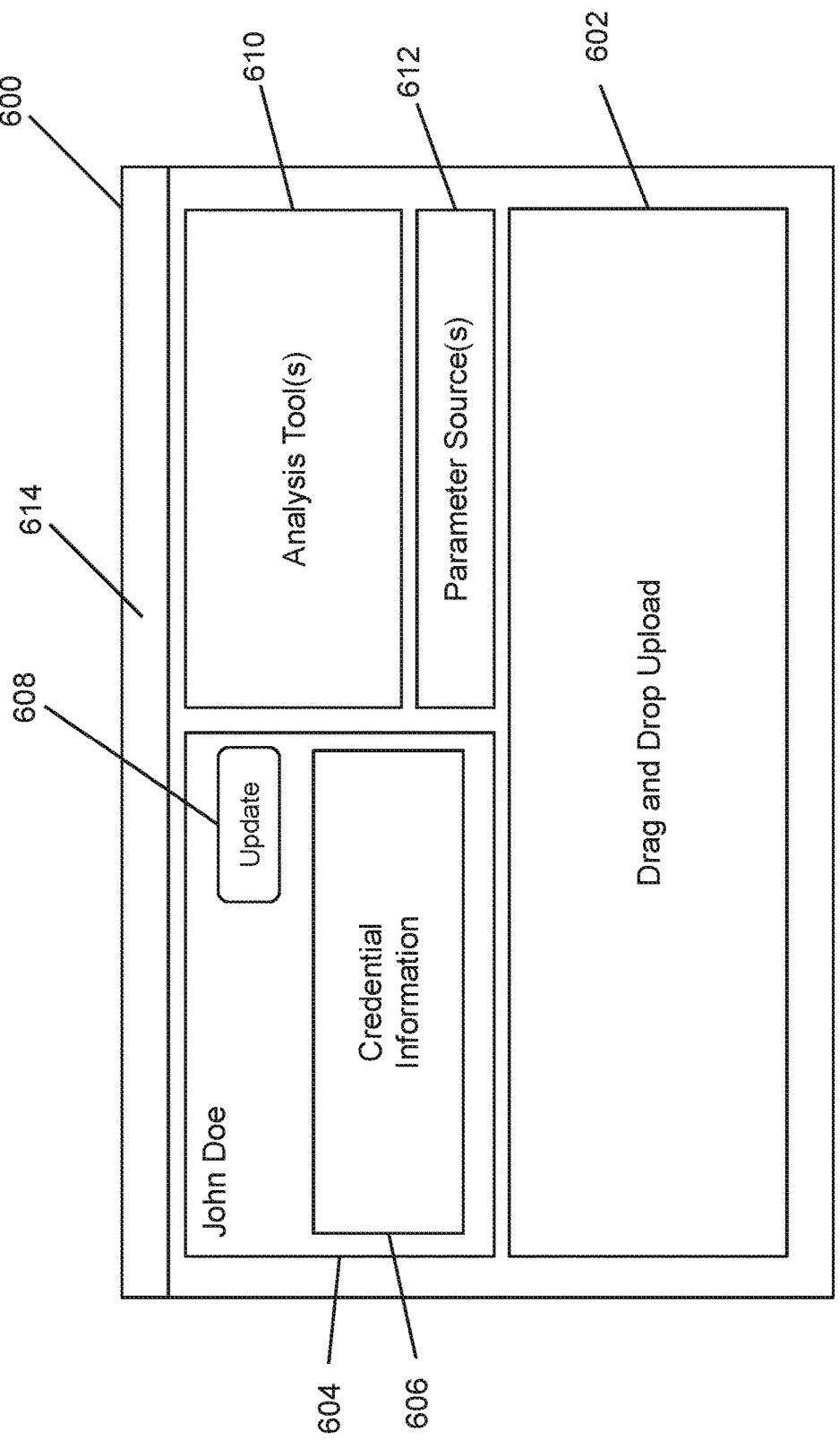
FIGS. 6A and 6B are each an example of graphical user interfaces for implementing security analyses.

Turning now to FIG. 6A, an example graphical user interface (GUI) 600 for the security platform 10 is shown (e.g., as generated by the web application server 408). The applications (e.g., web application and mobile application which rely upon the servers 406, 408) can be used to provide a dashboard or landing page to perform security analysis. It is understood that the shown graphical user interface can be a graphical user interface of a tool embodiment of the security platform.

In the shown example, the interface 600 includes a receiving element 602 for receiving data elements to be analyzed. In example embodiments, as shown, the receiving element 602 includes a drag-and-drop functionality, enabling a user of a client device 12 to drag a data element for analysis into the element 602 to conduct security analysis. In example embodiments, the receiving element 602 enables users to designate data elements, applications, and other digital elements for security analysis. For example, the receiving element 602 can enable users to navigate to a location within the device 12 to upload the data element, or an executable file of an application, etc.

The interface 600 can include a credential element 604, which lists or provides the status of any credential information to the user of the interface 600. For example, in the shown embodiment, the element 604 indicates the individual associated with the instance of the web browser which generates the interface 600 (e.g., John Doe), includes a display portion 606 listing all credential information associated with the individual, and provides a button 608 for updating or otherwise requesting changes to the credential information associated with the user, or the user, etc.

The portion 610 shows the analysis tools available via the interface 600. A tool's availability can be dependent upon to credentials of the requesting party (e.g. the credentials listed in element 604), an availability of each of the plurality of analysis tools (e.g., certain tools may be undergoing testing or updating, and are unavailable, or certain tools may not be available based on the location of the device 12 requesting the analysis), a status of the parameters 212 (e.g., the parameters 212 may mandate certain tools 211 be used, or the parameters 212 may prevent certain tools 211 (e.g., third-party provided tools) from being applied to certain files), a location of the data element, a status of prior testing (e.g., redundant testing may be prohibited), or a time of the request, etc.

The portion 612 can be populated with information relating to one or more management parameters 212 which are related to the analysis tools available. For example, the one or more management parameters 212 can specify which analysis tools are available for selection, which analysis tools are automatically selected, the processor sequence in which the analysis tools are applied, which analysis tools the credentialed user can access, which analysis tools can be access based on a location of the device 12, a method of accessing the interface 600 (e.g., a publicly available device 12 may be restricted from accessing certain analysis tools or data elements), etc.

As alluded to earlier, the interface 600 can be accessed in a variety of different manners. In example embodiments, the interface 600 can result from an application hosted by the enterprise system 16 application servers. In the shown embodiment, the interface 600 can be generated by a client device 12 using a publicly available web browser to navigate via the navigation bar 614 to a web application hosted by the enterprise system 16.

Figure 6B:
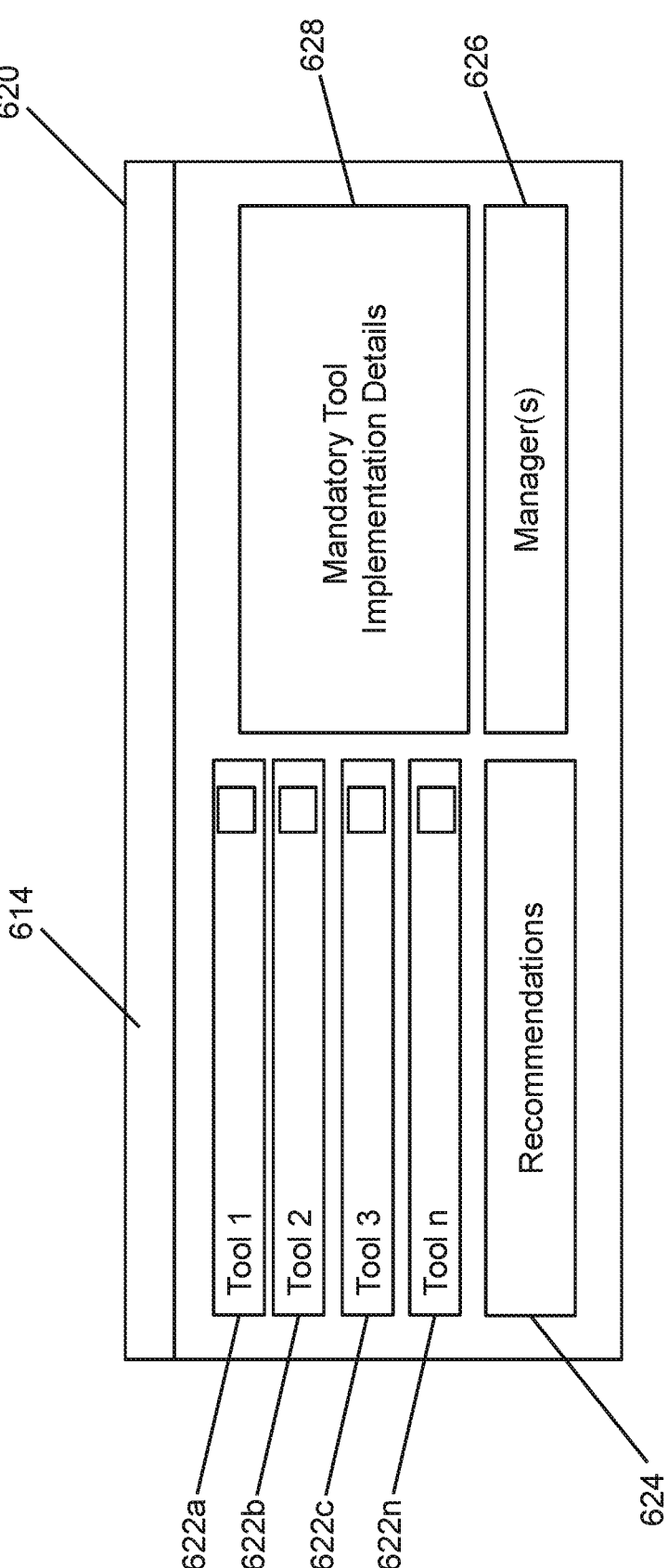

FIG. 6B shows an example screenshot 620 which can appear in response to receiving selection of a data element for analysis from a client device 12 or user.

In the screenshot 620, different tools can be selected via interactive elements 622 (e.g., as shown by separate interactive elements 622a, 622b, 622c . . . 622n for different tools) to perform analysis on the provided data element. In the shown embodiment, the tools are selected via a checkbox; however it is understood that various other methods of selecting the analysis tools are contemplated.

In example embodiments, the platform 10 performs a preliminary analysis of the provided digital element and generates a recommended set of security analyses for the element. The recommended set of security analysis can be selected by the user by way of a dedicated interactive element 624.

The screenshot 620 can also include one or more informative elements. For example, in the shown embodiment, the screenshot 620 includes informative element 626 which provides contact information for personnel able to change the available tools, or other parameters for performing security analysis, etc. The screenshot 620 also shows the informative element 628, which informs the user of any mandatory, or pre-populated analysis tools or other implementation details. For example, the informative element 620 can include a listing of all mandatory tools, and the order of testing, and the location where raw results data will be stored, etc.

Figure 7:
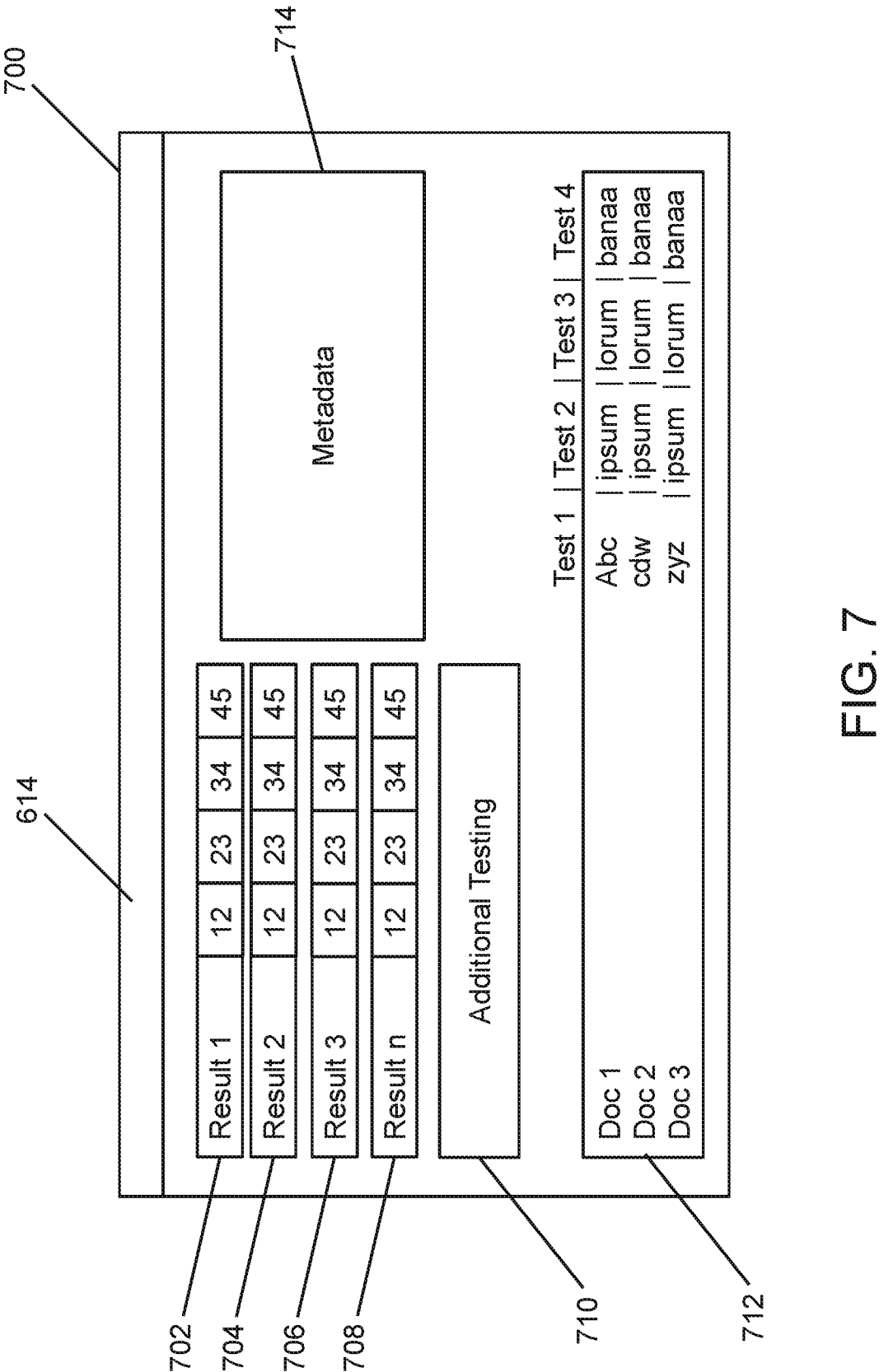
FIG. 7 is an example of a graphical user interface for displaying consolidated security analysis results.

Referring now to FIG. 7, an example screenshot 700 for displaying test results is shown. The screenshot can include individual tool 211 test results, as shown by results 702, 704, 706, and 708, or aggregated tool 211 test results, as shown by results 712. The results elements within the screenshot 700 can enable viewing of more detailed testing data upon user selection of the result. For example, the individual test result 702 can populate the screenshot 700 in response to selection of the test in the aggregate results 712.

In example embodiments, the screenshot 700 is populated with a metadata portion 714, which includes details related to the tests. For example, the metadata can include details about when testing was carried out, when and where the digital asset under test was received and stored, respectively, which user requested the test, which machine ran the test, etc.

The screenshot as shown includes an additional testing element 710, to enable the automating of additional testing.

It can be appreciated that the applications can be implemented as standalone applications or as a module or tool provided within the enterprise application 518 and/or web browser application 520 to be interacted with by the user of the client device 12.

Referring to FIG. 8, an example embodiment of computer executable instructions for processing hierarchical data is shown. At block 802, the security platform 10 (or the enterprise system 16, or client device 12) receives a data element 202. The data element 202 can come from a variety of sources. For example, block 902 can include the platform 10 periodically or constantly monitoring the datastore 20a. Continuing the example, the datastore 20a may be designated as a datastore 20a within the enterprise system 16, such that any data elements 202 send to the datastore 20a are automatically or periodically transmitted to or pulled by the platform 10.

In example embodiments, the data element 202 is received as a result of another security analysis flagging the data element 202, as shown in optional block 814. In this example, the other security analysis process may include the use of similar but different tools as compared to tools 211, a subset of tools 211, or a combination of the two. In example embodiments, the provider of the other security analysis may be different than the provider of the platform 210, to enable more robust security detection.

At block 804, an interface (e.g., GUI 600) is provided to enable selection of at least one of the plurality of analysis tools 211.

At block 806, the selected tools of the plurality of analysis tools 211 are determined. Determining can include determining the user selection, determining their availability, assigning resources to the tools 211 in order to enable testing (e.g., generating a sandbox, allocating computing resources, etc.).

In example embodiments, the tools 211 available for selection are impacted if there was another security analysis performed in block 814. For example, the platform 10 can default to testing the already flagged data element 202 with every tool 211 available as a result of a heightened alert status. In example embodiments, the flagged data element 202 is defaulted to restricted parameters 212 for controlling testing. For example, the flagged data element 202 can be sent to the most isolated sandbox, etc.

At block 808, the data element 202 is provided to each of the selected tools from block 806. The providing can include transmitting not only the data element 202, but relevant parameters 212 that are accepted by the tool 211 to control testing.

At block 810, the results of the testing of block 808 are received. In example embodiments, receiving includes retrieving the results from the relevant tool 211, or retrieving the results from a designated datastore, etc.

At block 812, the results are aggregated and output. For example, the results can be output in the form shown in FIG. 7.

In example embodiments, as alluded to above, the method shown in FIG. 8 is at least in part automated. For example, the data element 202 can be flagged during the course of automated scanning, and the platform 10 can apply tools 211 based on preconfigured parameters 212 that apply to a flagged data element 202 scenario. In another example, the platform 10 can automate a preliminary analysis, or a partial analysis with one or more tools 211, which enable a reviewer to get a snapshot of the security characteristics of the data element 202. For example, custom tools 211 that detect popular adversarial attacks for the relevant time period can be deployed automatically to every data element 202 within a designated database, or to all emails sent to a security department, and thereafter the reviewer can determine if additional testing is required. These automated systems may reduce the computational burden, the latency of the security analysis process, and diversify the types of individuals required to assess the security of data elements. For example, the invention(s) disclosed herein can enable less trained individuals to perform a first level of security testing, and thereafter elevate to more experience personnel for review based on the parameters 212 and the management parameters. Similarly, security testing flexibility and rapid response can be enabled through the control of the parameters 212 and management parameters.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for conducting data file security analyses, the device comprising:

a processor;

and a memory coupled to the processor, the memory storing computer executable instructions that when executed by the processor cause the device to:

receive a data file possessing one or more security characteristics to be analyzed;

determine one or more parameters related to the data file indicative of how to automate security testing of the data file;

provide an interface, the interface enabling individual selection of one or more analysis tools available for analyzing the one or more security characteristics of the data file, and further enabling selection of a recommended set of the one or more analysis tools, wherein the one or more analysis tools enabled for individual selection are based on the one or more parameters related to the data file, and wherein the recommended set is based on a preliminary analysis of the data file;

responsive to receiving selection of the recommended set via the interface, automatically provide the data file to each analysis tool in the recommended set to have a corresponding analysis performed by the respective analysis tool to evaluate the data file with respect to the one or more of the security characteristics;

receive results generated by each analysis tool in the recommended set; and aggregate and output the results in a review interface.

2. The device of claim 1, wherein the one or more analysis tools comprise a plurality of analysis tools and wherein different tools of the plurality of analysis tools are intended to test different ones of the one or more security characteristics.

3. The device of claim 1, wherein the one or more parameters are based on one of: credentials of a requesting party, an availability of each of the one or more analysis tools, an availability of computing resources, a preference, a predetermined analysis process, a status of the parameters, a location of the data file, a status of prior security testing, or a time of a request.

4. The device of claim 1, wherein the one or more parameters are updated based on one or more management parameters.

5. The device of claim 4, wherein the one or more management parameters are based on credentials of a requesting party, an availability of each of the one or more analysis tools, a status of the one or more parameters, a location of the data file, a status of prior security testing, or a time of a request.

6. The device of claim 1, wherein to provide the data file to each of the analysis tools in the recommended set, the device is caused to:

generate a sandbox for security testing the data file;

generate a dedicated channel for transmitting the data file; and transmit the data file to the sandbox via the dedicated channel.

7. The device of claim 1, wherein the data file is received via a web-based graphical user interface or application programming interface call.

8. The device of claim 1, wherein the interface and the review interface are generated by the same application.

9. The device of claim 1, wherein providing the data file to each of the analysis tools in the recommended set comprises loading at least one of the analysis tools in the recommended set locally, to perform analysis on the data file.

10. The device of claim 1, wherein the instructions cause the device to:

output the data file with a label based on whether the results satisfy preliminary release criteria; and output the results to a review function to determine if additional action is required.

11. The device of claim 1, wherein the results are aggregated using a machine learning model.

12. The device of claim 1, wherein the instructions cause the processor to:

perform the preliminary analysis of the data file, the preliminary analysis comprising restricting access to computing resources for the data file during the testing.

13. The device of claim 1, wherein the one or more analysis tools in the recommended set comprise a plurality of analysis tools, wherein the one or more parameters include a parameter defining an order for implementing the plurality of analysis tools, and wherein the data file is provided to the plurality of analysis tools for analysis according to the order defined by the parameter.

14. A method for assessing potentially malicious data files, the method comprising:

receiving a data file possessing one or more security characteristics to be analyzed;

determining one or more parameters related to the data file indicative of how to automate security testing of the data file;

providing an interface, the interface enabling individual selection of one or more analysis tools available for analyzing the one or more security characteristics of the data file, and further enabling selection of a recommended set of the one or more analysis tools, wherein the one or more analysis tools enabled for individual selection are based on the one or more parameters related to the data file, and wherein the recommended set is based on a preliminary analysis of the data file;

responsive to receiving selection of the recommended set via the interface, automatically providing the data file to each analysis tool in the recommended set to have a corresponding analysis performed by the respective analysis tool to evaluate the data file with respect to the one or more of the security characteristics;

receiving results generated by each analysis tool in the recommended set; and aggregating and outputting the results in a review interface.

15. The method of claim 14, wherein the one or more analysis tools comprise a plurality of analysis tools and wherein different tools of the plurality of analysis tools are intended to test different ones of the one or more security characteristics.

16. The method of claim 14, wherein the one or more parameters are based on one of: credentials of a requesting party, an availability of each of the one or more analysis tools, an availability of computing resources, a preference, a predetermined analysis process, a status of the parameters, a location of the data file, a status of prior security testing, or a time of a request.

17. The method of claim 14, wherein providing the data file to each of the analysis tools in the recommended set comprises loading at least one of the analysis tools in the recommended set locally, to perform analysis on the data file.

18. The method of claim 14, further comprising:

performing the preliminary analysis of the data file, the preliminary analysis comprising restricting access to computing resources for the data file during the testing.

19. The method of claim 14, wherein the one or more analysis tools in the recommended set comprise a plurality of analysis tools, wherein the one or more parameters include a parameter defining an order for implementing the plurality of analysis tools, and wherein the data file is provided to the plurality of analysis tools for analysis according to the order defined by the parameter.

20. A non-transitory computer readable medium for assessing potentially malicious data files, the computer readable medium comprising computer executable instructions for:

receiving a data file possessing one or more security characteristics to be analyzed;

determining one or more parameters related to the data file indicative of how to automate security testing of the data file;

providing an interface, the interface enabling individual selection of one or more analysis tools available for analyzing the one or more security characteristics of the data file, and further enabling selection of a recommended set of the one or more analysis tools, wherein the one or more analysis tools enabled for individual selection are based on the one or more parameters related to the data file, and wherein the recommended set is based on a preliminary analysis of the data file;

responsive to receiving selection of the recommended set via the interface, automatically providing the data file to each analysis tool in the recommended set to have a corresponding analysis performed by the respective analysis tool to evaluate the data file with respect to the one or more of the security characteristics;

receiving results generated by each analysis tool in the recommended set; and aggregating and outputting the results in a review interface.

* * * * *